US006975372B2

(12) United States Patent
Long (10) Patent No.: US 6,975,372 B2
(45) Date of Patent: Dec. 13, 2005

(54) LCD AND METHODS AND SYSTEMS FOR SAME

(75) Inventor: Michael D Long, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 81 days.

(21) Appl. No.: 10/252,334

(22) Filed: Sep. 23, 2002

(65) Prior Publication Data

US 2004/0056992 A1    Mar. 25, 2004

(51) Int. Cl.$^7$ ............................................. G02F 1/1335
(52) U.S. Cl. ........................... 349/96; 349/76; 349/103; 349/121; 349/179
(58) Field of Search .................... 349/96, 117, 121, 349/103, 179, 76, 116

(56) References Cited

U.S. PATENT DOCUMENTS

| 4,173,757 | A | * | 11/1979 | Hareng et al. ................. 345/50 |
| 5,122,890 | A | * | 6/1992 | Makow ......................... 349/96 |
| 5,682,180 | A | * | 10/1997 | Young et al. ................ 345/589 |
| 5,986,731 | A | * | 11/1999 | Iijima .......................... 349/117 |
| 6,362,834 | B2 | * | 3/2002 | Ishii ............................ 345/690 |
| 6,442,980 | B2 | * | 9/2002 | Preston et al. .............. 134/107 |
| 6,600,467 | B1 | * | 7/2003 | Webb ........................... 345/87 |

* cited by examiner

Primary Examiner—Diane I. Lee
Assistant Examiner—Seung H Lee (57) ABSTRACT

Methods and systems relating to a LCD are disclosed. In one exemplary embodiment, the LCD has an active state and an inactive state. The inactive state is configured to produce a desired residual image. The active state is configured to produce a desired non-residual image.

20 Claims, 5 Drawing Sheets

Fig. 3a
inactive

Fig. 3b
active

LCD AND METHODS AND SYSTEMS FOR SAME

BACKGROUND

Liquid Crystal Displays (LCDs) are common display devices utilized in various applications, such as display devices of notebook computers. LCDs can be black-and-white, or color, among other configurations. Existing LCDs can display an image when in an active state. This active state is generally achieved by supplying electrical energy to the LCD. When the energy is removed, the LCD fades to a uniform appearance or inactive state. Thus, current LCDs display useful images only as long as they are activated or otherwise supplied with energy.

Accordingly, this invention arose out of concerns associated with providing advantageous LCDs and LCD systems and methods.

BRIEF DESCRIPTION OF THE DRAWINGS

Related numbers are used throughout the drawings to reference like features and components.

DETAILED DESCRIPTION

Overview

In accordance with the various embodiments described below, the methods and systems relate to LCDs capable of displaying images when activated. The exemplary LCDs are also capable of displaying a desired residual image when in an inactive state.

The exemplary LCDs can be used for various suitable applications, including those customarily utilizing LCDs such as notebook computer displays and also in applications to which LCDs have previously been unsuitable.

Exemplary Embodiments

Figure 1:
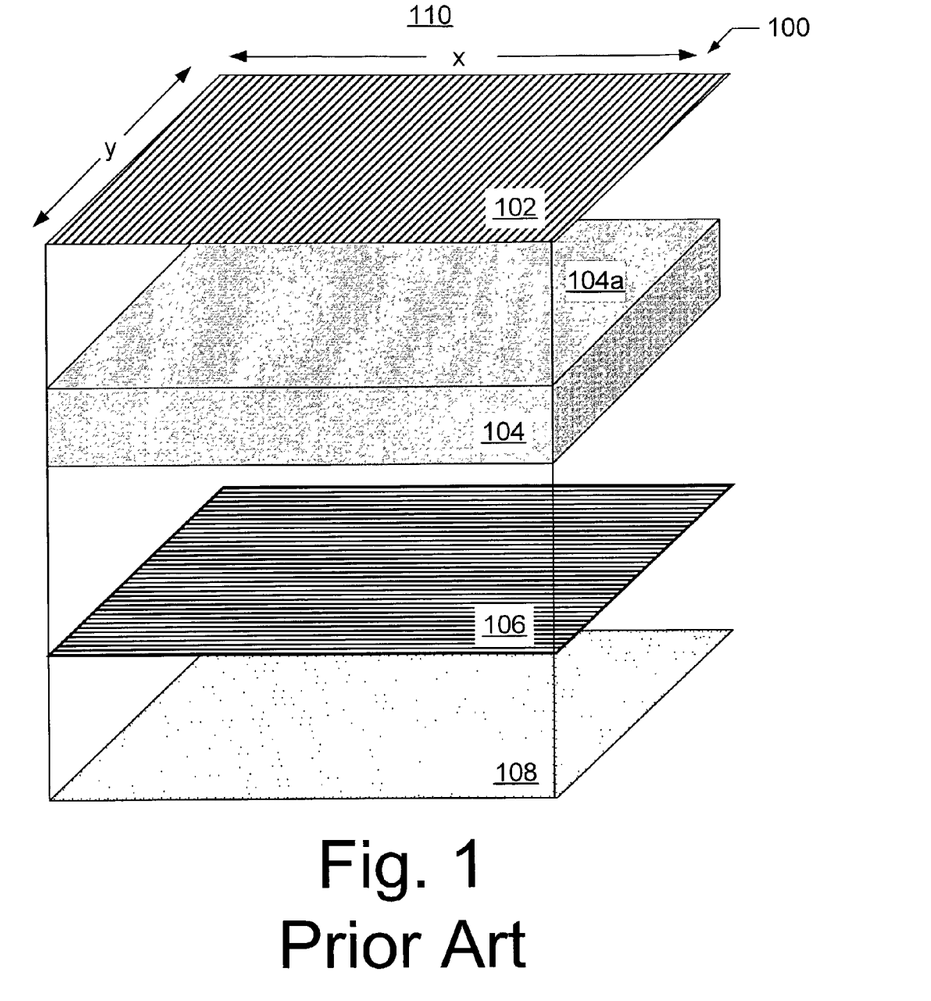
FIG. 1 shows a perspective view of a prior art LCD.

FIG. 1 shows components of a prior art LCD 100. Such LCDs generally have a first inactive state or condition where the entire LCD has a uniform appearance and a second active state where characters can be displayed. The uniform appearance of the inactive state is typically a blank screen.

The LCD shown here comprises a first polarizing sheet 102, a nematic layer 104, a second polarizing sheet 106, and a reflective material 108. The first polarizing sheet 102 is uniformly configured to allow only light with a specific orientation to pass through. Light can strike the first polarizing sheet from the ambient environment 110 generally above the sheet. As shown here, only light oriented along a y-axis can pass through the sheet. Other light, such as light oriented along an x-axis, is absorbed or otherwise dissipated.

The light that passes through the first polarizing sheet 102 encounters the nematic layer 104. The nematic layer can comprise various materials or compounds that can transform between two different states. In a first state the nematic layer affects the light, so that light which passes through from a first side 104a is re-oriented by 90 degrees (or values +/−180 degrees thereof) when it leaves a second opposite side (not shown). The nematic layer's second state allows light to pass through without altering the light's orientation. Commonly, and in the prior art embodiment shown here, the first state is achieved without external input. The second state is achieved by exposing the nematic material to an external input, such as electrical energy.

The second state is commonly achieved by supplying energy to various individual portions of the nematic material. A controller or control circuitry, commonly in the form of a chip set, can provide this control. The nematic material is generally comprised of individually controllable units comprising a matrix. The controller can supply energy to individual portions of the nematic material.

In the inactive state, as shown here, the nematic layer 104 re-orients the light 90 degrees. Thus, the light that enters the nematic layer oriented along the y-axis exits the nematic layer oriented along the x-axis. The second polarizing sheet 106, like the first, is uniformly configured to allow only light with a specific orientation to pass through or be transmitted. As shown here, light oriented along the x-axis is transmitted through the second polarizing sheet 106. So, in the inactive state, the light leaving the nematic layer 104 passes through the second polarizing sheet 106. The light then strikes the reflective layer 108, and reverses the process passing through the second polarizing layer 106 in an x-axis orientation. The light is then re-oriented 90 degrees by the nematic layer 104 to the y-axis and passes through the first polarizing layer 102. This light proceeds into the ambient environment and can be detected by a human observer.

Figure 1A:
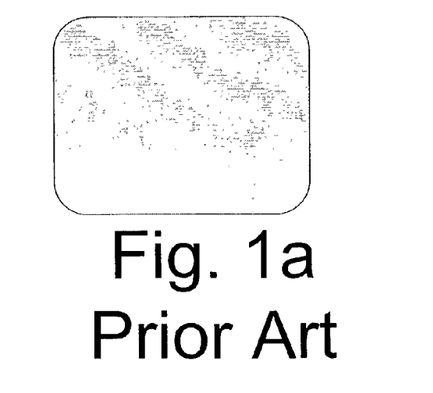
FIG. 1a shows a representation of an image formed by the prior art LCD of FIG. 1.

FIG. 1a shows an example of what such a prior art LCD can look like in the inactive state when the display is blank. Commonly, in the inactive state, the LCDs have a uniform light grey appearance, as shown here.

To display characters on the LCD, selected portions or pixels of the nematic layer 104 can be activated. These portions will then transform to the second state. In the second state, the nematic material no longer causes the light to be re-oriented and light passes through the nematic material retaining its original orientation. Thus, in the LCD described above, when light having a y-axis orientation strikes a portion of the nematic material that is in the second state, the light will maintain that orientation and not be transmitted through the second polarizing layer which only transmits light along an x-axis orientation. These portions or regions then appear black because no light is transmitted through them to be perceived by an observer.

By activating various portions of the nematic layer 104, the contrast between the active areas and the inactive areas can create desired characters or symbols on the LCD 100. When power is no longer supplied, the nematic material returns to its first state and the image returns to the uniform grey image as shown in FIG. 1a. Color LCDs have similar functionality, though each sub-unit or pixel can have a distinctly controllable unit for each color (red, blue, and green) to form a color image.

LCDs, such as the one described above, have proved useful for various applications. However, by only being able to display an image or characters in the active or "powered-up" condition the LCDs have not been as useful and versatile as they could be.

Figure 2:
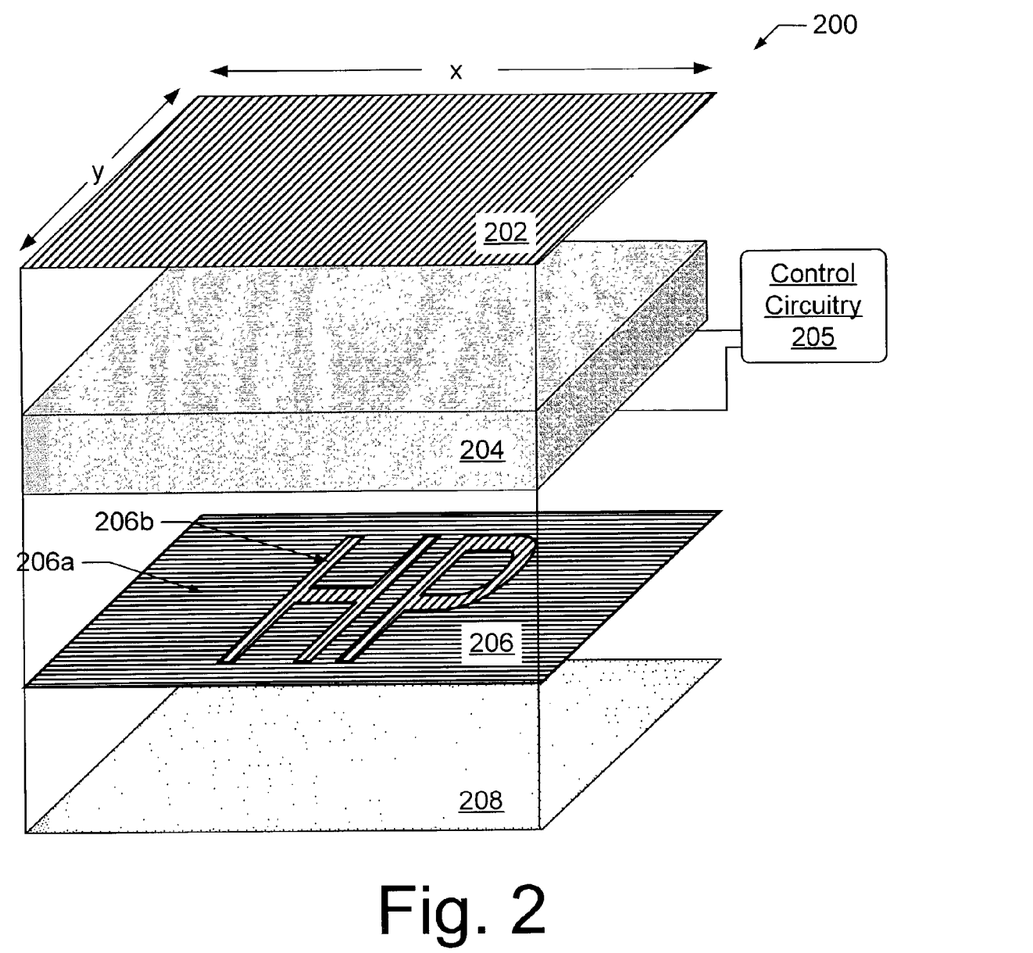
FIG. 2 shows a perspective view of an exemplary LCD in accordance with one exemplary embodiment.

FIG. 2 shows components comprising an exemplary LCD 200 in accordance with one embodiment. This embodiment can display desired images similar to the prior art example described above, and can also display a desired residual image.

The exemplary LCD 200 shown here comprises a first polarizing sheet 202, a nematic layer 204, control circuitry 205, a second polarizing sheet 206, and a reflective layer 208.

The first polarizing sheet 202 can be any suitable material that is configured to allow light having a specific orientation to be transmitted or pass through, while absorbing or otherwise blocking other light not having the specific orientation. In some embodiments, this can be achieved by embedding polarizers in the sheet to effectively achieve the polarizing functionality.

As shown here, the first polarizing sheet 202 is oriented to allow light having an orientation along a y-axis to pass through while blocking other orientations. The light then contacts the nematic layer 204 which is positioned between the first and second polarizing sheets. The nematic layer can comprise any suitable twisted nematic or super-twisted nematic, or any other material having an equivalent functionality.

The nematic layer 204, as described above, includes a material that can transform between first and second distinct states. The state of this nematic material can be controlled by, among other things, supplying electrical energy to the nematic material. In this embodiment, the state of individual portions of the nematic layer can be controlled separately. For example, the nematic layer can comprise a matrix, or an assembly of pixelized units, that can be controlled individually as will be discussed in more detail below. In some embodiments, the nematic layer can be electrically coupled to control circuitry 205. In some embodiments, the control circuitry can comprise a chip set, for controlling the individual portions comprising the matrix. Other suitable configurations will be recognized by the skilled artisan.

In this embodiment, the nematic layer 204, in the first inactive or non-powered state, transforms the orientation of light by 90 degrees (or values +/−180 degrees thereof) as described above. When electrical energy is supplied to the nematic material, the material converts to the second state that can allow light to pass through unaltered.

As shown in this embodiment, when the nematic layer 204 is in the first state, light enters the nematic layer having a y-axis orientation and leaves the nematic layer having an x-axis orientation. The light then encounters the second polarizing sheet 206. As shown in this embodiment, the second polarizing sheet has two portions. A first portion 206a has a first orientation, and a second portion 206b, has a second, different orientation. In this example, the second orientation is essentially perpendicular to the first orientation. As shown in this embodiment, the first portion 206a comprises the majority of the sheet and is oriented along the x-axis. The second portion 206b is oriented along the y-axis. This is but one possible configuration. As shown here, the second portion defines the letters "H" and "P", though other suitable embodiments can form various other combinations of symbols, characters and/or images as desired.

In this embodiment, with the nematic layer 204 in the first state (i.e. with no power supplied to the nematic layer), the light contacting the second polarizing sheet 206 will have an orientation along the x-axis. Light striking the first area 206a will be transmitted through the sheet, while light striking the second area 206b will not be transmitted because that area has an orientation along the y-axis. The light that passes through the first area can be reflected by the reflective layer 208 and reverse its path back through the layers. This area will generally appear as light grey to an observer. Since no light passed through the second area that portion appears black to an observer. A representative image can be seen in FIG. 2a. This image is taken from above the first polarizing sheet 202.

Figure 2A:
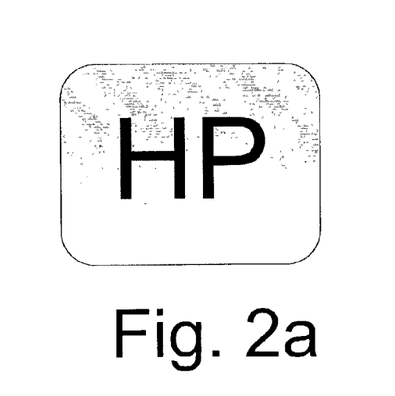
FIG. 2a shows a representation of an image formed by the exemplary LCD of FIG. 2.

The exemplary embodiment described in relation to FIGS. 2 and 2a produces a desired residual image without any electrical input to the nematic layer. The exemplary embodiments can also display any desired image by activating individual portions of the nematic layer, as will be described in more detail below.

Figure 3:
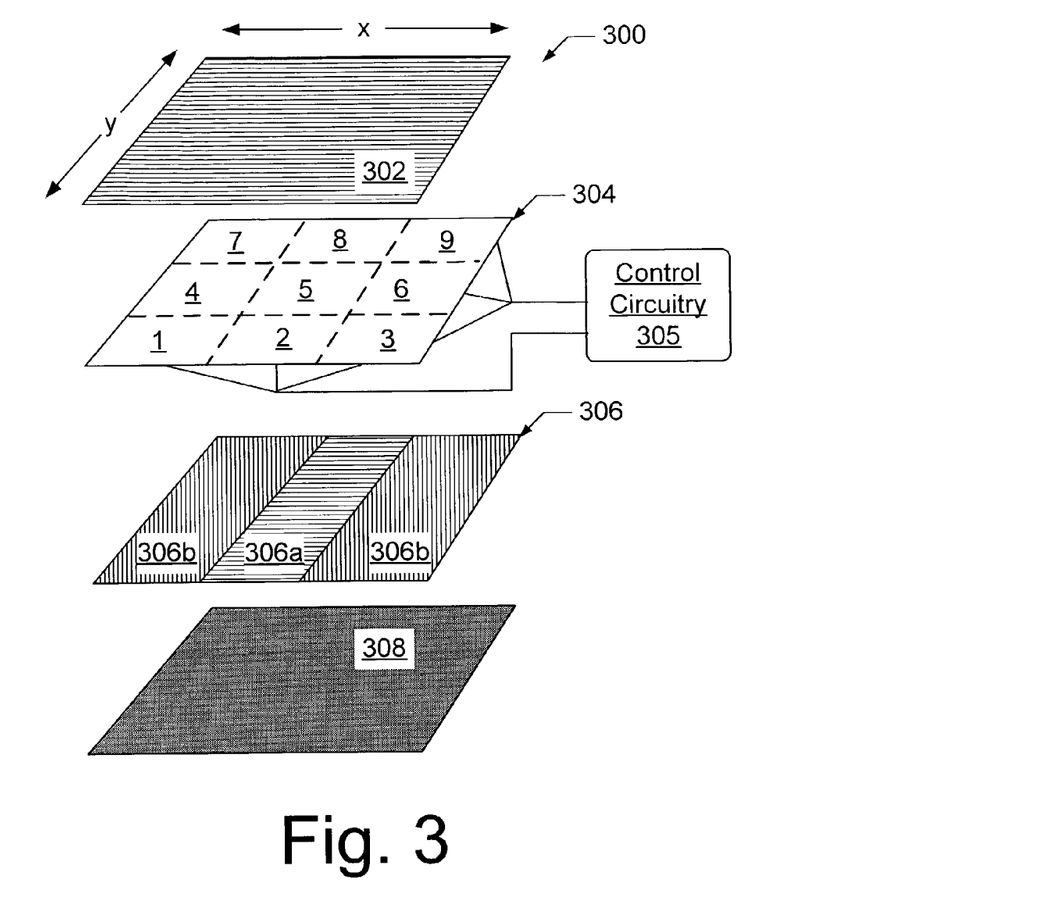
FIG. 3 shows a perspective view of an exemplary LCD in accordance with one exemplary embodiment.
Figure 3A:
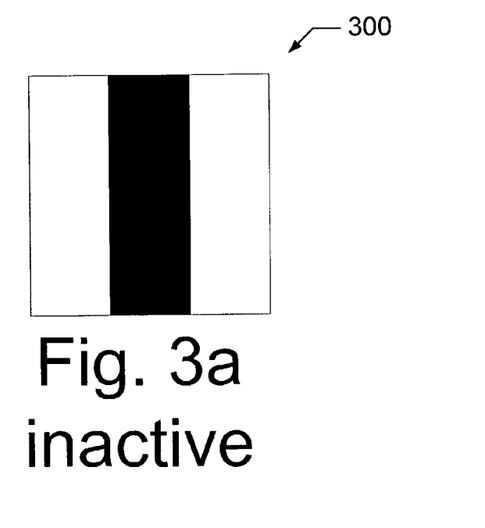
FIGS. 3a–b show a representation of an image formed by the exemplary LCD of FIG. 3.
Figure 3B:
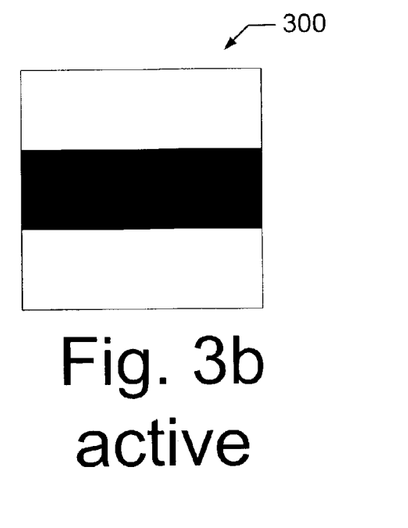

FIG. 3 shows an exemplary LCD 300 capable of having an active state, and an inactive state. FIG. 3a shows a representation of a residual image produced by the LCD of FIG. 3 while in the inactive state. FIG. 3b shows a representation of a desired image produced in the active state.

The LCD 300 comprises a first polarizing sheet 302, a nematic or matrix layer 304, control circuitry 305, a second polarizing sheet 306, and a reflective layer 308.

As shown in this embodiment, the nematic layer 304 comprises a matrix of individually controllable discrete sub-units labeled 1–9. The individual sub-units comprising the matrix can be controlled by the control circuitry in various suitable ways as will be recognized by the skilled artisan. The control circuitry can be a dedicated controller or can utilize components of an electronic device upon which the LCD is positioned.

In this embodiment, portions of the second polarizing sheet 306 are selectively-oriented parallel to the first polarizing sheet 302 along the x-axis. As shown here, these selectively-oriented portions 306a are positioned below nematic sub-units 2, 5, and 8. The remainder of the second polarizing sheet corresponding to sub-units 1, 3, 4, 6, 7, and 9 is oriented along the y-axis and is labeled 306b. When the nematic layer 304 is in the inactive state, light can pass through the first polarizing sheet 302 oriented along the x-axis and can be re-oriented 90 degrees by the nematic layer. The light then strikes the second polarizing sheet 306 oriented along the y-axis. The light striking the selectively-oriented portions 306a will not be transmitted, while the light striking the remaining portion (306b) of the sheet 306 will be transmitted through to the reflective layer 308 and back out of the LCD in a reverse order. Thus, in the inactive state, the exemplary LCD of FIG. 3 can produce the residual image seen in FIG. 3a.

If a second image is desired, such as the one shown in FIG. 3b, the LCD 300 can be configured to the active state. The active state allows energy to be supplied to individual sub-units of the nematic layer to cause them to change from a first state to a second state. In the second state, light can pass through the nematic material while maintaining its original orientation.

In some embodiments, the second image, such as the one shown in FIG. 3b, can be achieved with recognition of the appearance of individual portions of the LCD in the residual image. If a region or portion of the LCD corresponding to a specific nematic sub-unit (1–9) appears dark in both the residual image and in the desired active image, no energy is supplied to that sub-unit of the nematic layer. If a portion of the LCD image is desired to change from dark to light, or light to dark, then the corresponding sub-unit of the nematic layer (such as one or more of sub-units 1–9 of nematic layer 304) can be energized. So, the appearance in the residual image of a portion of the LCD corresponding to a particular sub-unit can be taken into account when controlling the various nematic sub-units to form a desired active image.

FIGS. 3–3b provide examples of controlling individual portions or regions of the LCD 300 to form a desired active image. In the residual image shown in FIG. 3a, the area corresponding to sub-unit 2 of the nematic layer 304 is black or dark in the inactive state and is desired to be grey or light in the representation shown in FIG. 3b. To achieve this, the control circuitry 305 can activate sub-unit 2 of the nematic layer to achieve light transmission through this portion of the LCD as described above. In contrast, sub-unit 5 appears black in the residual image and the desired active image, so the control circuitry can leave sub-unit 5 inactive. The other sub-units can be controlled in a corresponding manner that accounts for the orientation of the various sub-units of the second polarizing sheet 306 in the residual image and a desired active image.

A simplified embodiment is shown here for the purposes of illustration. One of skill in the art will recognize that the same principles can be applied to LCDs having complex residual patterns and potentially millions of sub-units or pixels comprising the nematic layer.

Figure 4:
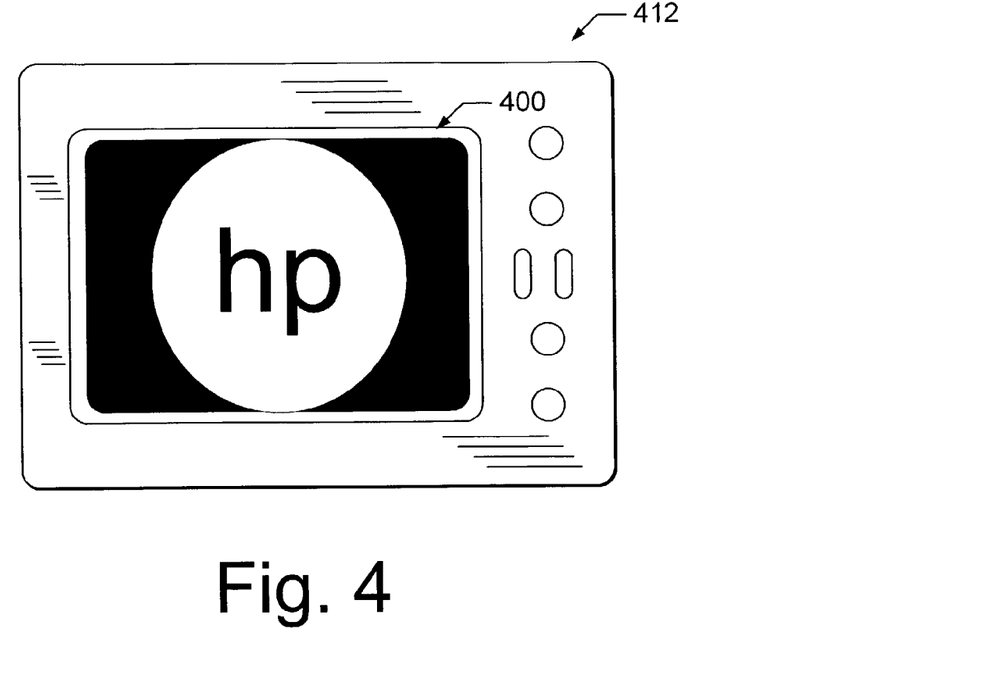
FIGS. 4–5 show a top view of an exemplary consumer device in accordance with one exemplary embodiment.
Figure 5:
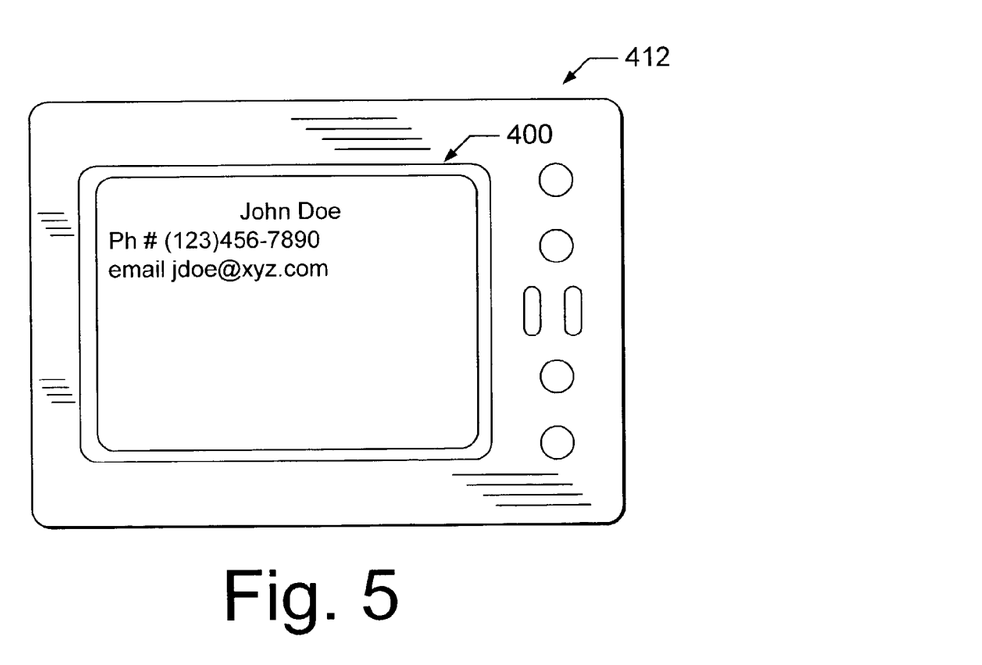

The described embodiments can be used in virtually limitless different applications. FIG. 4 shows an exemplary LCD 400 incorporated onto a consumer device. In this embodiment, the LCD 400 comprises a display device of a personal digital assistant (PDA) 412. As shown here, the PDA is in an off or standby mode in which the LCD correspondingly displays a desired residual image. In this embodiment, the LCD can display the residual image without requiring any power input. This can allow the residual image to be displayed virtually indefinitely even in applications having a finite power supply. When the PDA is powered-up, the exemplary LCD can perform the functions normally associated with an LCD used for such a purpose, such as displaying text, an example of which can be seen in FIG. 5.

Figure 6:
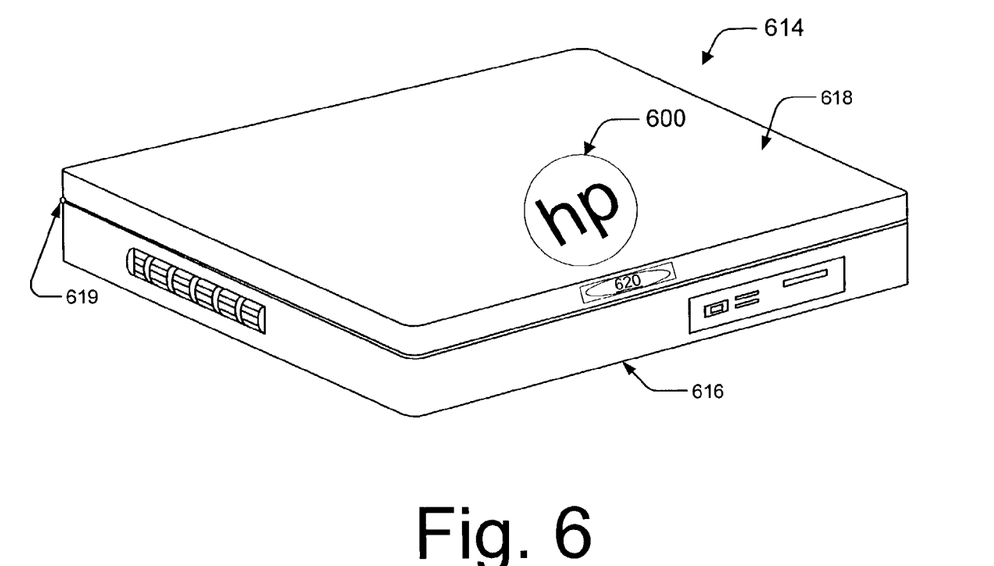
FIGS. 6–7 show perspective views of an exemplary consumer device in accordance with one exemplary embodiment.

FIG. 6 shows another embodiment utilizing an exemplary LCD 600 incorporated on a consumer device. In this exemplary embodiment, the LCD 600 is positioned on a notebook computer 614. In this embodiment, the LCD is not utilized in a traditional manner, but instead can be utilized to display an emblem, logo, or other desired images.

In this embodiment, the notebook computer 614 has a base portion 616 and a deployable display portion 618. As shown here, the display portion can pivot or deploy relative to the base portion via a hinge 619. Previously, a plastic emblem, or some other type of logo displaying a symbol was attached to the backside of the display portion in a manner similar to the image on LCD 600 in FIG. 6. However, a fixed display is less than satisfactory. For example, if the symbol is oriented on the display portion to be readable by an observer positioned in front of the computer and generally opposite the hinge 619, then when the display portion 618 is deployed for use, the symbol would appear upside down to observers positioned behind the computer.

Figure 7:
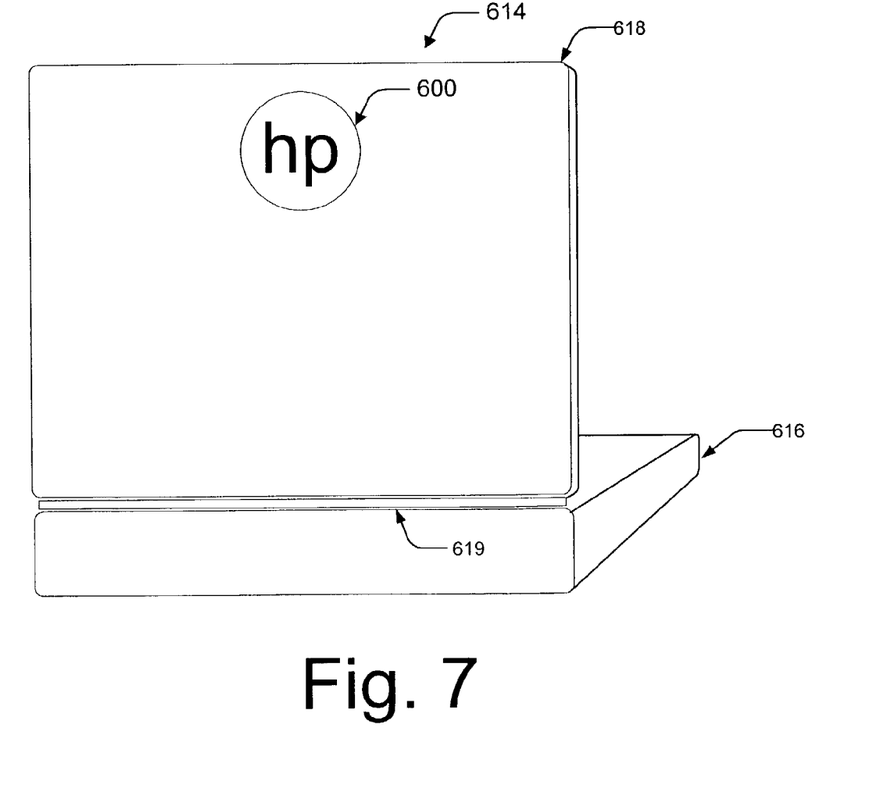

In this exemplary embodiment, the LCD 600 can be positioned similar to previous emblems and display a desired residual image, such as the one shown in FIG. 6. Some embodiments can achieve this residual image without requiring any electrical input or other control of the LCD. This is advantageous in that it does not drain the battery. In this example, when a specified condition is met (such as when the display portion is opened), the LCD can be activated and can display a second image. FIG. 7 shows an example of such a second image.

FIG. 7 shows a representation where the LCD 600 has been activated to produce a symbol on the LCD that appears similar to FIG. 6. However, the symbol is now displayed on the LCD so that it is properly oriented to be read by an observer positioned behind the computer 614 (proximate hinge 619) rather than an observer positioned in front of the computer as in FIG. 6.

The exemplary LCD 600 can be triggered to switch from the first residual image to the second active image by any suitable means. For example, in one embodiment, the LCD can be activated by pressing a screen release button 620 (shown FIG. 6) that allows the display portion to be rotatably deployed for use. Pressing the display release button can generate a signal that causes a controller to activate the LCD. In a further example, the LCD can be triggered by activating or powering-up the computer. Other satisfactory means can include a sensor that can sense a first generally-horizontal storage position of the display portion and a second generally-vertical user position. Such embodiments can display a residual image when the computer is configured in the storage position and an active image when the computer is in the user position. The skilled artisan will recognize other satisfactory sensory mechanisms that can be utilized to affect the state of the LCD.

The exemplary embodiments described above feature a first polarizing sheet having a uniform orientation and a second polarizing sheet having portions having two different orientations. Other exemplary embodiments can have a uniform second sheet and a varied first sheet, or any suitable combination thereof. The described embodiments also utilize ambient light as a light source for the light that is perceived by an observer. Other satisfactory embodiments can utilize other sources of light.

The exemplary LCDs can be used in any conventional application such as a display device for a consumer device as described above. Additionally or alternatively, exemplary LCDs can be utilized in a multitude of other applications where the LCD is incorporated onto some type of consumer device. A consumer device can be any item offered for sale to consumers, business or private. For example, an exemplary LCD can be positioned on an automobile in place of an existing emblem so that when the car is turned-off, the residual image is displayed and when the car is running, a desired active image is displayed. The skilled artisan will recognize other suitable applications.

CONCLUSION

The described embodiments relate to an improved LCD that can display a desired residual image in a first inactive state. The LCD can also display different desired images in a second active state. The residual image can be displayed without using any power or requiring other external input. In the active state the exemplary LCDs can be controlled to display images similar to existing technologies which cannot display a desired residual image.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A LCD comprising:
   a first polarizing sheet;
   a nematic layer;
   a second polarizing sheet, the nematic layer positioned between the first and second polarizing sheets;
   a reflective layer positioned adjacent the second polarizing sheet; and,
   at least portions of the first or second polarizing sheet comprising a portion selectively-oriented thereon, the selectively-oriented portion being oriented essentially perpendicular to a remainder of the sheet and defining a desired image.

2. The LCD of claim 1, wherein the nematic layer comprises a nematic matrix.

3. The LCD of claim 1, wherein the nematic layer comprises a twisted nematic.

4. The LCD of claim 1, wherein the nematic layer comprises a super-twisted nematic.

5. A consumer device embodying the LCD of claim 1.

6. A LCD comprising:
   first and second polarizing sheets disposed in a generally parallel relationship with one another and having polarizers positioned thereon;
   a matrix layer positioned between the first and second polarizing sheets and having a first inactive state in which light is transmitted along a first orientation and a second active state in which individual sub-units can be activated to transmit light along a second different orientation;
   a reflective layer positioned adjacent the second polarizing sheet and opposite the matrix layer;
   the polarizers of the first polarizing sheet being oriented in a first direction; and,
   less than an entirety of the polarizers of the second sheet being oriented in a direction that is different from the first direction such that the second polarizing sheet defines a desired residual image when the matrix layer is in the inactive state.

7. The LCD of claim 6, wherein the matrix layer comprises an active nematic matrix.

8. The LCD of claim 6, further comprising a controller for activating the matrix layer.

9. The LCD of claim 8, wherein the controller is configured to control individual portions of the matrix layer.

10. The LCD of claim 8, wherein the controller comprises a dedicated chip set for controlling the matrix layer.

11. The LCD of claim 6, wherein the residual image comprises a symbol.

12. A consumer device comprising, at least in part, the LCD of claim 6.

13. A LCD polarizing sheet comprising:
    a plurality of polarizers positioned on the sheet, the sheet having at least first and second portions;
    the first portion of the sheet having polarizers positioned in a first orientation; and,
    the second portion of the sheet having polarizers positioned in a second orientation different from the first orientation to define a symbol.

14. The polarizing sheet of claim 13, wherein the second orientation is perpendicular to the first orientation.

15. The polarizing sheet of claim 13, wherein the second portion comprises multiple discrete portions.

16. The polarizing sheet of claim 13, wherein the sheet is positioned between a nematic layer end a reflective layer of a LCD.

17. A LCD comprising, at least in part, the polarizing sheet of claim 13.

18. A LCD display device comprising:
    first means for polarizing light along a first orientation;
    second means for polarizing light, wherein a first portion of the second means polarizes light along the first orientation and a second portion polarizes light along a second different orientation sufficiently to define a desired image;
    controllable nematic means positioned between the first and second means; and,
    reflective means positioned opposite the controllable nematic means.

19. A LCD polarizing sheet comprising:
    a plurality of polarizers positioned on the sheet, the sheet having at least first and second portions;
    the first portion of the sheet having polarizers positioned in a first orientation; and,
    the second portion of the sheet having polarizers positioned in a second orientation different front the first orientation to define a letter.

20. A LCD display device comprising:
    a nematic matrix comprised of individually controllable sub-units and having a first inactive state and a second active state; and,
    a polarizing layer positioned over the nematic matrix and defining a desired image which is residual on the LCD display device when the nematic matrix is in the inactive state.

* * * * *

UNITED STATES PATENT AND TRADEMARK OFFICE
CERTIFICATE OF CORRECTION

PATENT NO. : 6,975,372 B2 Page 1 of 1
APPLICATION NO. : 10/252334
DATED : December 13, 2005
INVENTOR(S) : Michael D Long

It is certified that error appears in the above-identified patent and that said Letters Patent is hereby corrected as shown below:

In column 8, line 16, in Claim 16, delete "end" and insert -- and --, therefor.

In column 8, line 38, in Claim 19, delete "front" and insert -- from --, therefor.

Signed and Sealed this

Fourteenth Day of July, 2009

JOHN DOLL
*Acting Director of the United States Patent and Trademark Office*